CONTROLLED LATCHING SEMICONDUCTOR SWITCH AND SWITCHING NETWORK

Filed March 31, 1965 4 Sheets-Sheet 1

INVENTOR
ERNEST F. HASELTON, JR.

BY Spencer E. Olson

ATTORNEY

CONTROLLED LATCHING SEMICONDUCTOR SWITCH AND SWITCHING NETWORK

Filed March 31, 1965 4 Sheets-Sheet 2

INVENTOR
ERNEST F. HASELTON, JR.
BY Spencer E. Olson
ATTORNEY

INVENTOR
ERNEST F. HASELTON, JR.

BY Spencer E. Olson

ATTORNEY

CONTROLLED LATCHING SEMICONDUCTOR SWITCH AND SWITCHING NETWORK

Filed March 31, 1965 4 Sheets-Sheet 4

INVENTOR
ERNEST F. HASELTON, JR.
BY Spencer E. Olson
ATTORNEY 3,389,228

United States Patent Office

Patented June 18, 1968

3,389,228

CONTROLLED LATCHING SEMICONDUCTOR SWITCH AND SWITCHING NETWORK

Ernest F. Haselton, Jr., West Concord, Mass., assignor to Sylvania Electric Products Inc., a corporation of Delaware Filed Mar. 31, 1965, Ser. No. 444,139
15 Claims. (Cl. 179—18)

ABSTRACT OF THE DISCLOSURE

A gating network is employed in conjunction with a multilayer controlled semiconductor device, having latching capabilities, to control the switching of a relay associated with a cross-point in a switching matrix.

This invention relates generally to switching systems, and more particularly to improved switching matrices employing an electrically operated switching circuit.

In many switching applications, such as in a telephone communication system, a communication path is provided between two parties by selectively establishing a number of cross-point connections in an array of switching matrices. The use of electromechanical switching devices, or relays, to provide these connections is well known, and relays are widely used because of their many highly desirable characteristics such as high open-contact resistance, low closed contact resistance, long life, reliability and economy. The major disadvantage of the switching relay is the slow response time inherent in its operation, since it depends upon the movement of a mechanical element to establish a relay contact. This feature of the relay is not compatible with the trend of recent developments toward a reduction in the time required to establish connections within a switching network. For example, in an automatic telephone communication system, it is desirable to reduce the control time required to establish connections within the switching network, thereby permitting a single, high-speed control system of moderate complexity to efficiently handle a large number of calls in a given time.

Recently developed switching relays and associated circuits, such as disclosed in U.S. Patents No. 3,037,085 and No. 3,141,079, have improved speed characteristics and are useful in many switching applications. However, these switching devices require relatively high level current pulses, on the order of many milliamperes for a duration of many microseconds, to establish a connection and furthermore, systems utilizing these devices require an associated memory, or an additional sensing device such as disclosed in U.S. Patent No. 3,005,876 to determine the state of the device; i.e., whether it is available to establish a connection. Normally, these devices also require an additional control pulse of the same magnitude to change the device from the switched (closed) state to the unswitched (open) state. In systems using a large number of these devices, there is a substantial peak power requirement. Since these devices are current responsive, it is not possible to connect them in series and still maintain low working voltages.

It is, therefore, a principal object of this invention to provide a switching network consisting of arrays of switching matrices wherein the establishment of a connection through the network is controlled by electrical pulses of short duration and are at low-curent, low-voltage levels.

A further object of this invention is to provide a switching network requiring no associated memory or additional sensing means to determine the state of switching devices within the network.

A general object of this invention is to provide a switching network compatible with high speed control systems.

Briefly, the invention resides in the utilization of the charge transfer characteristic of a resistance-capacitance (RC) network and the control characteristics of recently available multi-layer controlled semiconductor devices having latching capabilities, of which the silicon-controlled rectifier (SCR) is in most common current use, to control the switching of a relay associated with a cross-point in a switching matrix. The SCR has characteristics similar to the well-known thyratron, having an anode and cathode, and a gate electrode for controlling its conduction. A low level current in the gate-cathode circuit acts to switch the device into conduction even though an anode voltage of less magnitude than the forward breakdown voltage is impressed on the device. As applied in the present invention, the SCR is switched to its conducting state by a control pulse applied across a resistor, the two terminals of which are connected via respective capacitors to its gate and cathode electrodes. The SCR cathode is connected to a suitable source of energizing potential, and a relay coil is connected between the SCR anode and ground. The RC time constant is so chosen that the RC network stores energy sufficiently long for the SCR to go into full conduction, after which it is no longer necessary to maintain a potential at the SCR gate electrode.

In one application of the invention to be described, the matrices of a switching network are so interconnected that only a single control pulse of short duration is required to establish a path through an entire system, while in another descriptive embodiment it is necessary to address each matrix individually.

The foregoing and other objects, features and advantages of the invention and a better understanding of its construction and operation will become apparent from the following detailed description, taken in conjunction with the accompanying drawings, in which.

Figure 1:
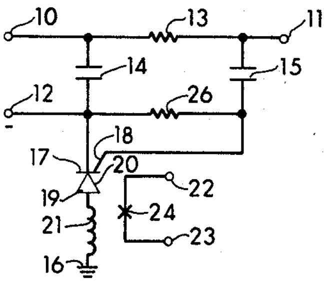
FIG. 1 is a schematic circuit diagram of a switching circuit according to the invention.

The switching circuit of the invention, shown schematically in FIG. 1, includes a resistor 13 connected between two terminals 10 and 11, to which input signals may be applied, a first capacitor 14 connected between terminal 10 and the cathode electrode 17 of an SCR 20, and a second capacitor 15 connected between terminal 11 and the gate electrode 18 of the SCR 20. The cathode electrode 17 of the SCR is also connected to a suitable source of energizing potential, represented by terminal 12, and a relay coil 21 is connected between the anode electrode 19 of the SCR and a point of reference potential 16. The relay contacts 24, denoted by the symbol X, are connected between terminals 22 and 23, the opening and closing of the relay contacts being controlled by the current through the relay coil. The contacts are open when the current through the relay coil is less than the required holding current of the relay and are closed when the current through the coil exceeds this holding current. Although only one set of relay contacts 24 is shown, it will be appreciated that any number of sets of relay contacts may be controlled by a single relay. The circuit of FIG. 1 is suggested for use with a relay having only one control coil, such as the Automatic Electric relay number P.D. 12035–4, as opposed to a relay having separate pull and hold control windings.

Briefly, the operation of the circuit in FIG. 1 is as follows. In the absence of current through the SCR and the relay coil, the relay contacts 24 are open. To energize the relay coil and thereby close the relay contacts 24, a positive pulse of short duration is applied to terminal 11 and a negative pulse of the same duration is simultaneously applied to terminal 10, which together develops a potential across resistor 13 which charges capacitors 14 and 15 to produce a positive potential between the gate and cathode electrodes of SCR 20. The discharge path for the charge on the capacitors is through the gate-to-cathode junction of the SCR and upon discharge, gate-to-cathode current flows, thereby establishing carriers in the SCR semiconductor. The discharge time is determined by the RC time constant of the resistor-capacitor network. Upon the establishment of the carriers in the SCR, anode-to-cathode current flows in the SCR and through the relay coil 21, activating the relay and closing the relay contacts 24 to establish a direct connection between terminals 22 and 23. Once the current through the SCR exceeds its minimum holding current requirements, gate-to-cathode current is no longer required, so it is only necessary that the above-mentioned RC time constant be slightly greater than the time required to established the above-mentioned holding current. To de-energize the relay and open relay contacts 24, the cathode of the SCR is placed at ground potential for a time sufficient to reduce the current through the SCR below its required holding current level.

In practice, it may be necessary to place a limiting resistor between the cathode electrode of the SCR 20 and the source of energizing potential 12, and in some applications circuit operation is improved by connecting a bleeder resistor 26 between the gate and cathode electrodes of the SCR.

Figure 2:
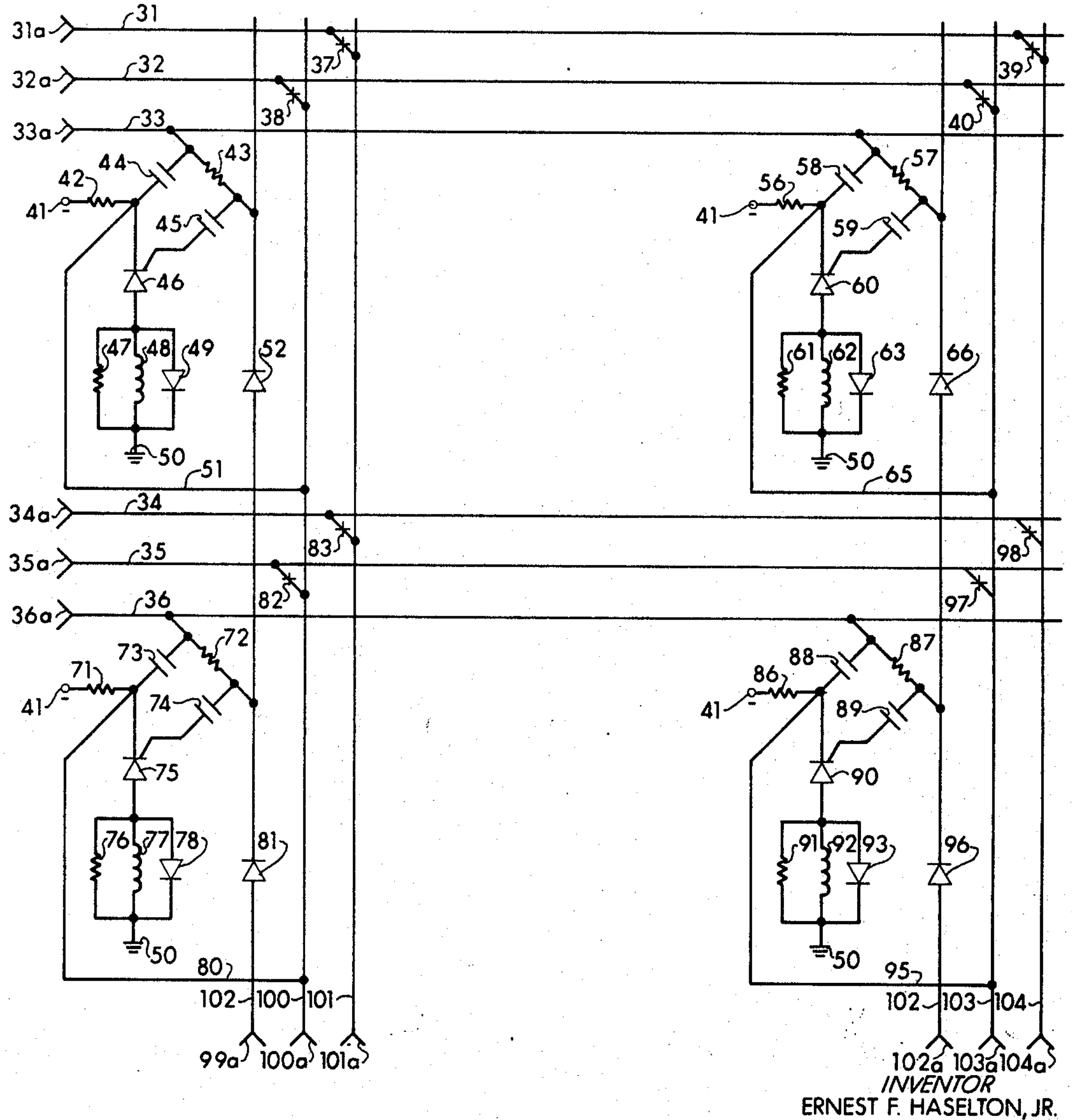
FIG. 2 is a schematic circuit diagram of a preferred embodiment of a switching matrix incorporating the circuit of FIG. 1.

FIG. 2 illustrates the application of the switching circuit of FIG. 1 in a switching matrix. For simplicity, only a 2 x 2 matrix is shown, but it will be evident from the following detailed description that the description is applicable to any M x N matrix. The matrix consists of two sets of horizontal conductors, the upper set consisting of three lines 31, 32 and 33, and the lower set including three lines 34, 35 and 36, and two sets of vertical conductors, one set consisting of three lines 99, 100 and 101, and the other comprising lines 102, 103 and 104. Each set of conductors represents a link of a potential transmission path, and since the two sets of horizontal conductors intersect the two sets of vertical conductors in four places, there are four possible transmission paths through the matrix. Associated with each intersection is a modification of the circuit of FIG. 1. For example, in the circuit associated with SCR 46, a resistor 42 is connected between the cathode electrode of the SCR and the source of energizing potential represented by terminal 41, and a resistor 47 and a diode 49 are connected in parallel with the relay coil 48. In addition, the cathode electrode of SCR 46 is connected directly via line 51 to the vertical line 100, and a diode 52 is inserted in vertical line 99 between adjacent intersection points. In all other respects, the construction and operation of the switching circuits of FIG. 2 are the same as described in connection with FIG. 1.

While the relay coil 48 is shown as controlling the opening and closing of two sets of relay contacts 37 and 38, any number of sets of relay contacts may be controlled by a single relay coil whereby any number of lines may be used in a vertical or horizontal conductor group.

The operation of the matrix of FIG. 2 will be understood from the following description of the manner in which direct connections are made between lines 31 and 104, and between lines 32 and 103. A positive pulse of short duration is applied to input terminal 102a and a negative pulse also of short duration is simultaneously applied to input terminal 33a, which together develop a potential across resistor 57 and charge capacitors 58 and 59. As described previously, the capacitors discharge across the gate-to-cathode junction of SCR 60, thereby establishing carrier conductors in the SCR. This initiates anode-to-cathode current through the SCR, which instantaneously flows through resistor 61, so the back EMF of the relay coil does not oppose the flow of current in the SCR. As the current increases, the back EMF of the relay coil 62 is overcome and more current flows through the coil and less through the resistor. When the current through the relay coil reaches a level determined by the characteristics of the relay, the contacts 39 and 40 are drawn closed, establishing the desired connection from line 31 to line 104 and from line 32 to line 103. Since the current through SCR 60 from source 41 exceeds the holding current of the relay, the contacts are held closed until deliberately released.

To open the relay contacts 39 and 40, either of input terminals 103a or 32a is connected to ground potential thereby grounding the cathode of SCR 60 and effectively removing the source of energizing potential 41. The diode 63 connected in parallel with the relay coil 62 allows the counter EMF generated in the coil to be passed to ground, thereby shortening the turn-off time of the SCR.

It will be noted that the matrix of FIG. 2 inherently provides a signal voltage for determining whether or not a given set of crosspoints is available to establish a connection. For example, if SCR's 75 and 46 are nonconducting, the potential at terminal 100a is equal to the potential of source 41, since there is no voltage drop across resistors 71 and 42. This indicates that the sets of crosspoints associated with these SCR's are available to establish a path. However, if either SCR 75 or SCR 46 is conducting, the potential at terminal 100a is the voltage drop across the conducting SCR and its relay coil. This represents a "busy" signal, indicating that these paths are unavailable to establish connections. Thus, a simple sensing circuit is all that is required to determine the availability of a set of crosspoints for establishing a connection through a given matrix.

An operative embodiment of the matrix of FIG. 2 has been constructed utilizing the following circuit components:

| | | |
|---|---|---|
| SCR's 46, 60, 75, 90 | | 3N84 |
| Diodes 49, 52, 63, 66, 78, 81, 93, 96 | | 1N914 |
| Capacitors 44, 45, 58, 59, 73, 74, 88, 89 | p.f.d. | 100 |
| Resistors 43, 57, 72, 87 | ohms | 2K |
| Resistors 42, 56, 71, 86 | do | 50 |
| Resistors 47, 61, 76, 91 | do | 10K |
| Relays (including contacts) 48, 62, 76, 92 [1] | | |

[1] Automatic Electric P.D. 12035–4.

Figure 3:
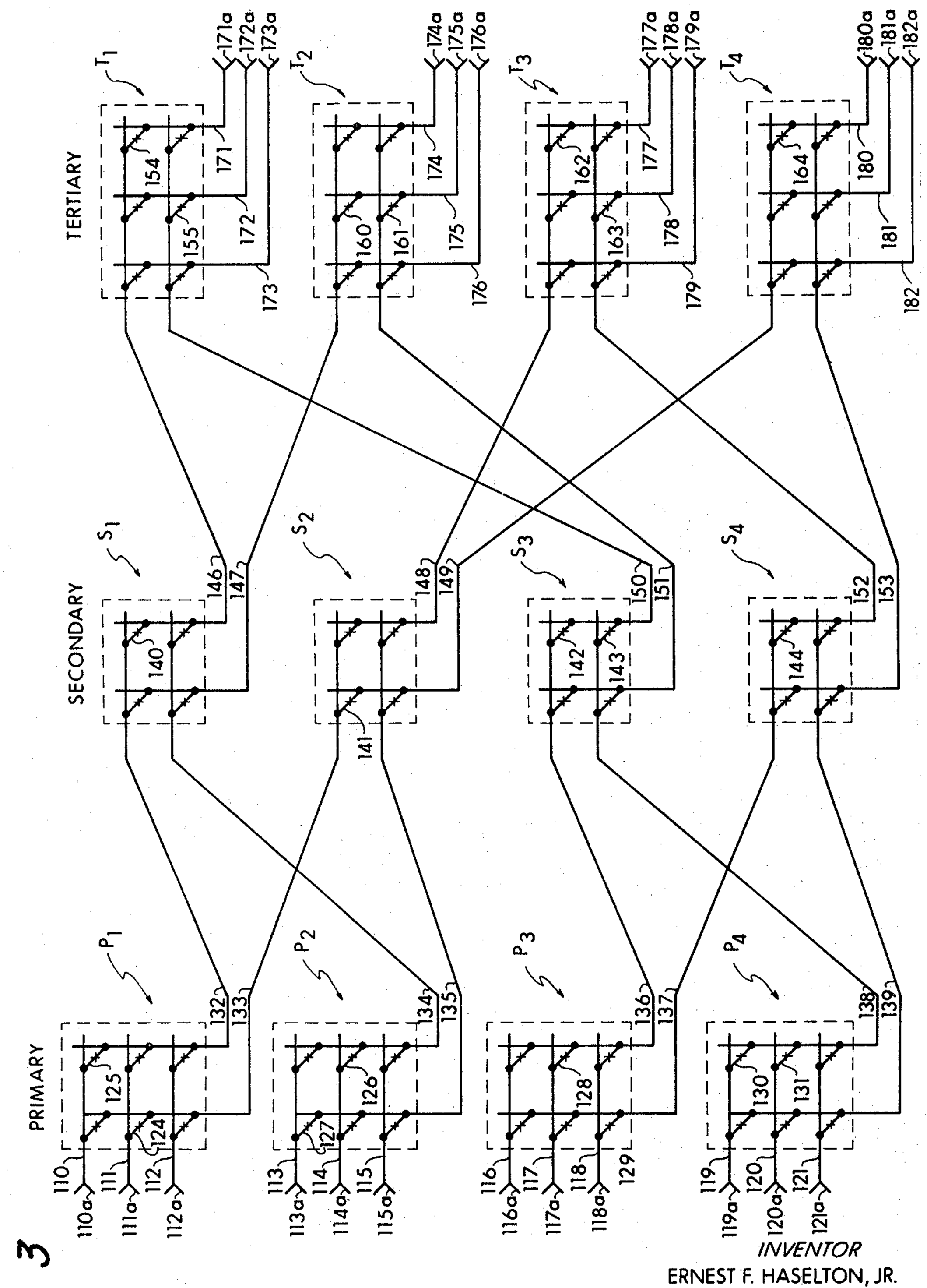
FIG. 3 is a diagrammatic representation of a three stage switching network embodying the invention.

FIG. 3 is a diagrammatic representation of a three stage switching network in which the invention has particular utility, and wherein the matrix of FIG. 2, or modifications thereof, are utilized. For simplicity of illustration, each line shown represents a set of conductors. For example, line 110 might represent lines 31, 32 and 33 of FIG. 2. In the network of FIG. 3, the primary stage comprises four 3 x 2 matrices, P1, P2, P3 and P4, which are interconnected with the four 2 x 2 matrices, S1, S2, S3, and S4 of the secondary stage of the network. The four matrices of the secondary stage are, in turn, interconnected with four 2 x 3 matrices, T1, T2, T3, and T4 of the tertiary stage. It will be noted that a vertical line in one matrix is connected to a horizontal line in a matrix of a succeeding stage; i.e., line 133 represents a vertical group in matrix P1 and a horizontal group in matrix S2.

This switching network provides one and only one path from a given input terminal in the primary stage to a given output terminal in the tertiary stage; i.e., from terminal 120*a* of P4, for example, to terminal 172*a* of T1, the only path is via line 120 in P4 through the contacts 131 to line 137 to S3, and thence through contacts 143 to line 150 to T1, and through contacts 155 to line 172 and terminal 172*a*.

Figure 4:
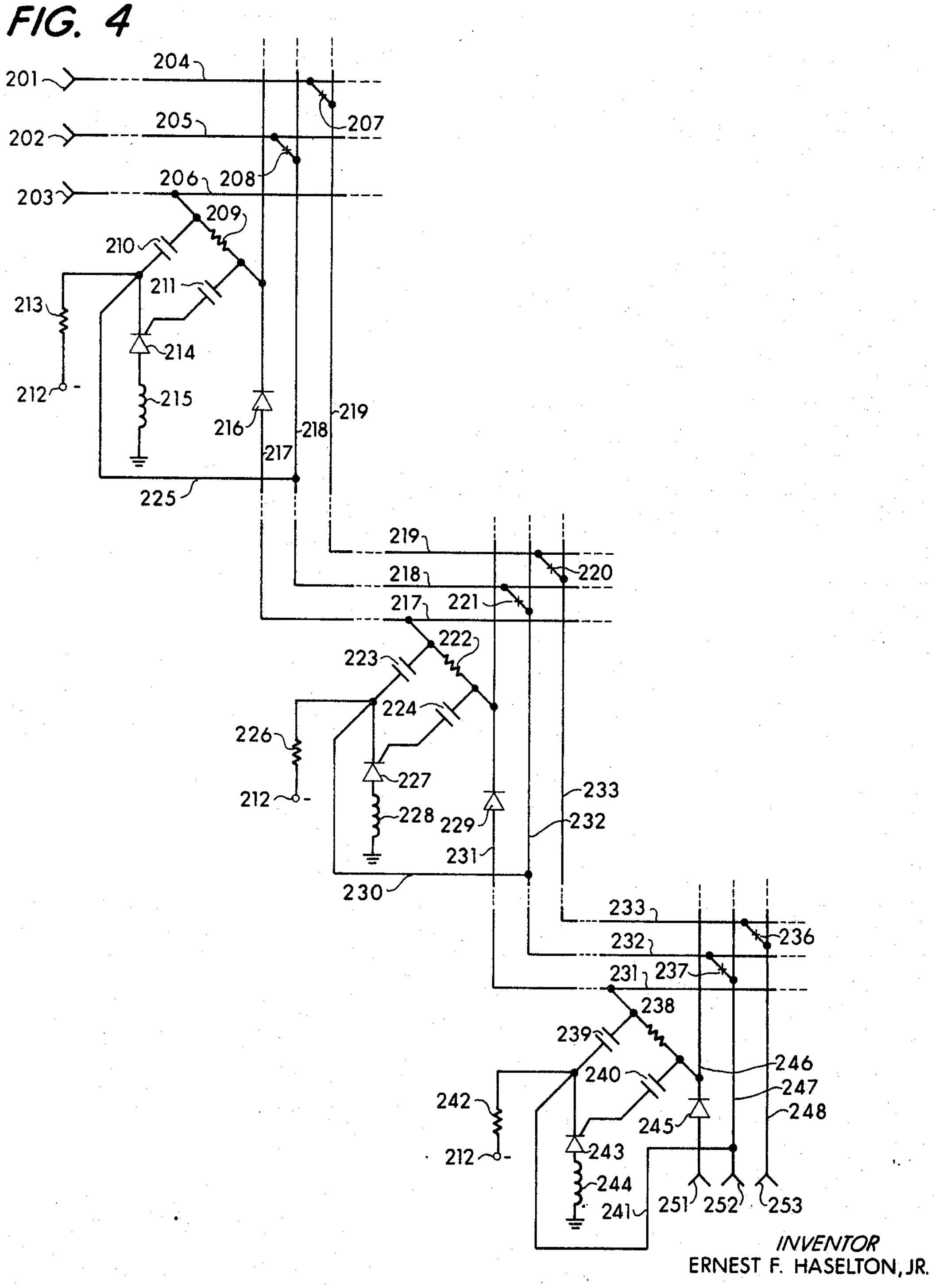
FIG. 4 is a partial scematic circuit diagram of an array of switching matrices forming a switched path in a network.

For a better understanding of the operation of the switching network of FIG. 3, reference is made to the partial schematic representation of an array of switching matrices shown in FIG. 4. In this representation, it is assumed that an available path has been located in the network of FIG. 3, the three sets of cross-points shown in FIG. 4 representing the selected connections to be established in the three reference frames to establish direct connections between input terminals 201 and 202 and output terminals 253 and 252, respectively. It will be appreciated that lines 204, 205 and 206 correspond to a single line in FIG. 3, such as line 110; that lines 217, 218 and 219 to line 133 of FIG. 3; that lines 231, 232 and 233 correspond to line 149; and that lines 246, 247 and 248 may correspond to line 182, by way of example. The switching operation of these circuits is the same as that described in connection with FIG. 2, except that only one set of simultaneously applied pulses is required to switch all three stages. A positive pulse is applied to terminal 251 at the same time that a negative pulse is applied to terminal 203. The total potential is divided across resistors 209, 222 and 238, thereby charging capacitors 210, 211, 223, 224, 239, and 240. The charged capacitors make the gate electrode of each of SCR's 214, 227, and 243 positive with respect to the potential of its respective cathode electrode, thereby establishing carriers in the SCR's. Anode-to-cathode current is initiated through the SCR's and, as previously described, current through the SCR's increases above the required holding current, activating the associated relays and closing the relay contacts, thereby establishing the desired direct connections between the input and output terminals. To break the connections, the relays are deenergized by connecting either of terminals 202 or 252 to ground potential which is applied via lines 225, 230 and 241 to the cathode electrodes of the SCR's 214, 227, and 243, respectively, effectively removing the source of holding current 212. The SCR's cease conducting and with the holding current removed the relays, the associated relay contacts open and the connections are broken.

Figure 5:
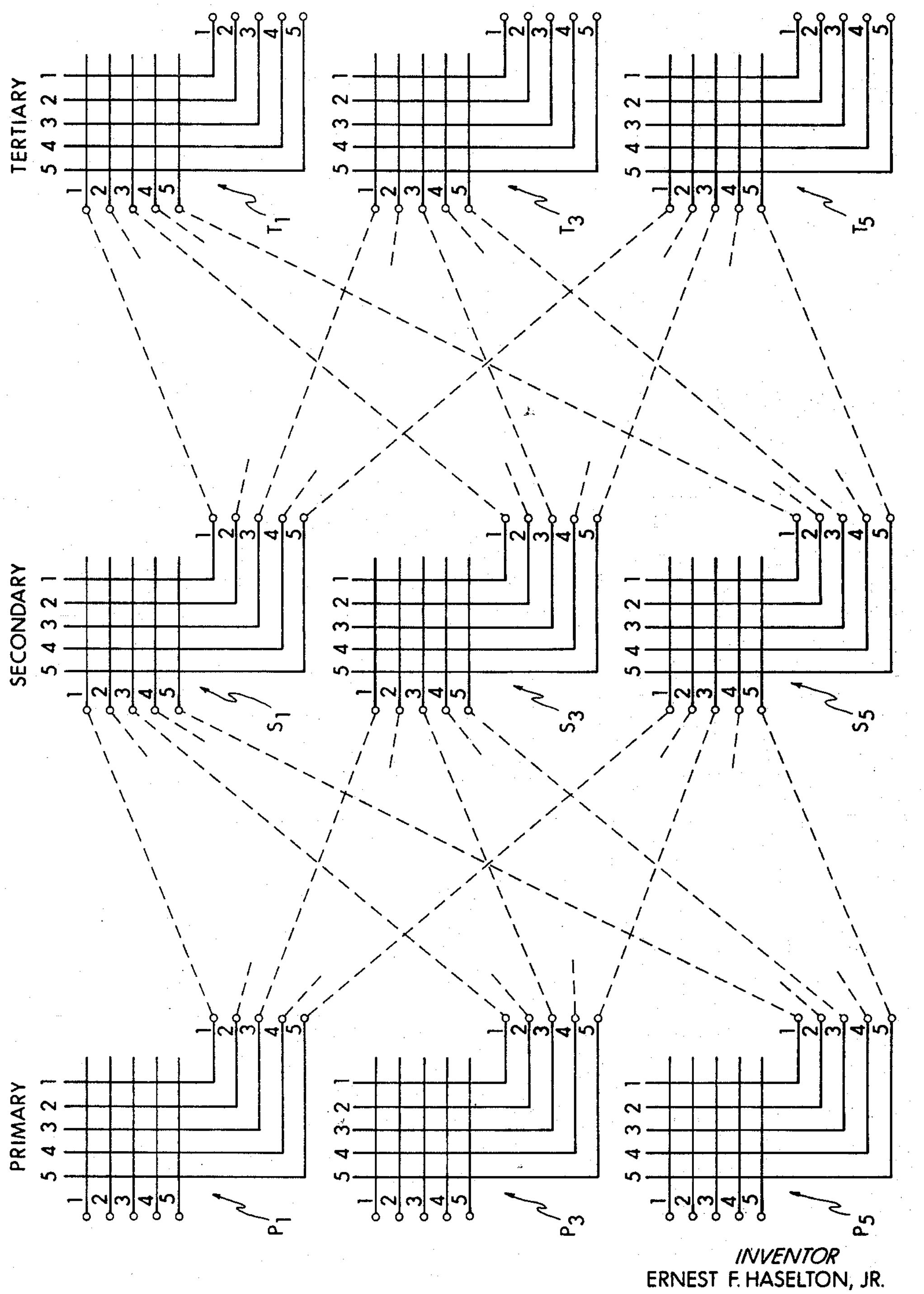
FIG. 5 is a diagrammatic representation of an alternate three stage switching network embodying the invention.

The switching network illustrated in FIG. 5 has three stages of switching matrices with five 5 x 5 matrices in each stage. The basic difference between this network and that illustrated in FIG. 3 is that there is more than one possible path between a given input terminal and a given output terminal. Therefore, it is necessary to address each selected matrix in establishing a path through the network. Otherwise, the implementation of the network is the same as that of FIG. 3.

From the foregoing description, it is apparent that the invention provides a switching system wherein the switching of a crosspoint, or a series of crosspoints, is initiated by the application of low-current, low-voltage pulses of short duration from a central control. Therefore, such a system is compatible with high speed control systems, where a central control system is able to process a larger number of calls per unit time than was possible with prior art systems. Furthermore, this system does not require an associated memory or additional sensing device to determine the state of the switching devices within the network. It is to be appreciated that this switching concept is compatible with existing communication systems, requiring modification of the systems control only.

While illustrative embodiments of the invention have been shown and described, it will be obvious to those skilled in the art that numerous arrangements may be devised without departing from the spirit and scope of the invention. For example, although the SCR has been described as the switching element, other devices with similar characteristics, such as the silicon-controlled switch (SCS) or the diode equivalent of the SCR, are within the contemplation of the invention, and it is intended that such devices be covered by the use in the claims of the term "controlled latching semiconductor device." It will also be apparent that, while the invention has been described as used in a communication system, the invention has application in any system requiring switching operations. It is therefore, intended that the invention not be limited to what has been described, but rather to embrace the full scope of the following claims.

What is claimed is:

1. An electrically controlled switching circuit comprising: a controlled latching semiconductor device having input, output and gate terminals, a source of energizing potential connected to the input terminal of said device, a relay having a control coil and at least one set of relay contacts, said control coil being connected between the output terminal of said device and a point of reference potential, a gating network having first, second, third and fourth terminals, said first and second terminals being D.C. isolated from said third and fourth terminals, said first and second terminals being respectively connected to the input and gate terminals of said device, and means for applying energizing signals simultaneously across said third and fourth terminals of said gating network, said gating network being operative to gate said device into conduction to cause current flow through said control coil sufficient to close said relay contacts.

2. The circuit according to claim 1 further including a resistor connected in parallel with said control coil, and a diode connected in parallel with said control coil.

3. The circuit according to claim 1 wherein said gating network comprises, a resistor connected between said third and fourth terminals, a first capacitor connected between said first terminal and said third terminal, and a second capacitor connected between said second and fourth terminals.

4. The circuit according to claim 3, wherein said gating network further includes a second resistor connected between said first and second terminals.

5. An electrically controlled switching circuit comprising, a silicon-controlled-rectifier having anode, cathode and gate electrodes, a source of energizing potential connected to the cathode electrode of said silicon-controlled-rectifier, a relay having a control coil and at least one set of relay contacts, said control coil being connected between the anode electrode of said silicon-controlled-rectifier and a point of reference potential, a gating network having first, second, third and fourth terminals, said first and second terminals being D.C. isolated from said third and fourth terminals, means respectively connecting said third and fourth terminals to the cathode and gate electrodes of said silicon-controlled-rectifier, and means for applying energizing signals simultaneously across the first and second terminals of said gating network, said gating network being operative to gate said silicon-controlled-rectifier into conduction to cause current flow through said control coil of sufficient magnitude to close said relay contacts.

6. The circuit according to claim 5 additionally including a resistor connected in parallel with said control coil, and a diode connected in parallel with said coil.

7. The circuit according to claim 5, wherein said gating network comprises, a resistor connected between said third and fourth terminals, a first capacitor connected between said first and said third terminals, and a second capacitor connected between said second terminal and said fourth terminal.

8. The circuit according to claim 7 wherein said gating network additionally comprises a second resistor connected between said first and second terminals.

9. A switching network comprising: a matrix of first and second pluralities of transmission line groups, each providing a multiple wire transmission path and each having at least one control line, a multiplicity of crosspoint devices defining potential transmission paths between each of said first plurality of transmission line groups and each of said second plurality of transmission line groups, each of said crosspoint devices having a current responsive element operative to establish transmission paths between selected groups of said first and second pluralities of transmission line groups, a link multiplicity of gating networks, one associated with each of said crosspoint devices, and connected between the control line of one of said first transmission line groups and the control line of one of said second transmission line groups, a like multiplicity of controlled latching semiconductor devices, one of said devices being connected in circuit with one of said gating networks and the current responsive element of its respective cross-point device, and means for applying to a selected gating network signals, said gating network being operative to trigger its associated semiconductor device to cause current to flow through the current responsive element of the associated crosspoint device to thereby establish the desired transmission paths between the selected groups of said first and second pluralities of transmission line groups.

10. A switching network, comprising: a matrix of first and second plurality of transmission line groups, each providing a multiple wire transmission path and each having at least one control line, a source of energizing potential, a multiplicity of crosspoint devices defining potential transmission paths between each of said first plurality of transmission line groups and each of said second plurality of transmission line groups, each of said crosspoint devices including a current responsive element operative to establish at least one transmission path between selected groups of said first and second plurality of transmission line groups in response to current flow through the current responsive element, a like multiplicity of gating networks each having first, second, third and fourth terminals, the first and second terminals of each of said gating networks being connected between the control line of one of said first plurality of transmission line groups and the control line of a group of said second plurality of transmission line groups, a like multiplicity of controlled latching semiconductor devices, each having input, output, and gate terminals, one of said semiconductor devices being associated with each of said gating networks and one of said crosspoint devices, means connecting the gate and input terminals of each of said semiconductor devices to the third and fourth terminals of its associated gating network, respectively, means connecting the input terminal of each of said devices to said source of energizing potential, means connecting the current responsive element of each of said crosspoint devices between the output terminal of its associated semiconductor device and a point of reference potential, and means for applying to the first and second terminals of a selected gating network energizing signals, said gating network being operative to trigger the associated semiconductor device to cause current to flow through the associated current responsive element.

11. The circuit according to claim 10, wherein each of said semiconductor devices is a silicon-controlled-rectifier having cathode, anode and gate electrodes corresponding respectively to the aforementioned input, output and gate terminals.

12. The circuit according to claim 10, wherein each of said crosspoint devices is a relay having at least one set of contacts and a control coil.

13. The circuit according to claim 12 further including a resistor connected in parallel with the control coil of each of said relays, and a diode connected in parallel with the control coil of each of said relays.

14. The circuit according to claim 10, wherein each of said gating networks comprises: a resistor connected between said first and said second terminals; a first capacitor connected between said first and said third terminals, and a second capacitor connected between said second and said fourth terminals.

15. The circuit according to claim 14, wherein each of said gating networks further includes a second resistor connected between said second and said fourth terminals.

References Cited

UNITED STATES PATENTS

| | | | |
|---|---|---|---|
| 3,020,353 | 2/1962 | Heetman | 179—18.7 |
| 3,288,939 | 11/1966 | Spellnes | 179—18.7 |
| 3,349,186 | 10/1967 | Bereznak | 179—18.7 |

OTHER REFERENCES

Harry W. Burke, RCA Technical Notes, RCA TN No. 503 (3–62).

KATHLEEN H. CLAFFY, *Primary Examiner.*

LAWRENCE WRIGHT, *Examiner.*